(12) United States Patent
Zuo et al.

(10) Patent No.: US 10,608,742 B2
(45) Date of Patent: Mar. 31, 2020

(54) SIGNAL MODULATION AND DEMODULATION METHOD AND SYSTEM, AND APPARATUS

(71) Applicant: Huawei Technologies Co., Ltd., Shenzhen, Guangdong, P.R. (CN)

(72) Inventors: Tianjian Zuo, Shenzhen (CN); Liang Zhang, Munich (DE); Enbo Zhou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/287,920

(22) Filed: Feb. 27, 2019

(65) Prior Publication Data

US 2019/0199439 A1    Jun. 27, 2019

Related U.S. Application Data

(63) Continuation of application No. PCT/CN2016/097721, filed on Aug. 31, 2016.

(51) Int. Cl.
*H04B 10/04* (2006.01)
*H04B 10/25* (2013.01)
(Continued)

(52) U.S. Cl.
CPC ....... *H04B 10/2503* (2013.01); *H04B 10/541* (2013.01); *H04L 27/26* (2013.01); *H04B 10/524* (2013.01)

(58) Field of Classification Search
CPC .............. H04B 10/5055; H04B 10/505; H04B 10/541; H04B 10/516; H04B 10/58;
(Continued)

(56) References Cited

U.S. PATENT DOCUMENTS 6,445,476 B1 * 9/2002 Kahn ................... G02F 1/0327
359/245
2015/0125160 A1   5/2015 Wen et al.
(Continued)

FOREIGN PATENT DOCUMENTS

CN        104144015 A      11/2014
CN        104467978 A       3/2015
(Continued)

OTHER PUBLICATIONS

Samani Alireza et al: "A Silicon Photonic PAM-4 Modulator Based on Dual-Parallel Mach-Zehnder Interferometers", IEEE Photonics Journal, IEEE, USA, vol. 8, No. 1, Feb. 1, 2016, XP011591868, 12 pages.

*Primary Examiner* — Hanh Phan
(74) *Attorney, Agent, or Firm* — Kilpatrick Townsend & Stockton LLP

(57) ABSTRACT

Embodiments of the present disclosure disclose a signal modulation and demodulation method and system, and an apparatus, to eliminate SSBI generated in a modulation and demodulation method. The method includes: performing, by a transmit end, PAM encoding on an input signal to obtain a PAM signal; electrically modulating, by the transmit end, the PAM signal by using a first filter; converting, by the transmit end, the electrically modulated PAM signal into an analog signal; optically modulating, by the transmit end, the analog signal by using an electro-optic modulator to obtain an optical signal, and sending the optical signal. Another method includes receiving, by a receive end, the optical signal, and converting the optical signal into an electrical signal; electrically demodulating, by the receive end, the electrical signal by using a second filter; and performing PAM decoding, by the receive end, the electrically demodulated electrical signal to obtain a restored input signal.

19 Claims, 4 Drawing Sheets

(51) Int. Cl.
*H04L 27/26* (2006.01)
*H04B 10/54* (2013.01)
*H04B 10/524* (2013.01)

(58) Field of Classification Search
CPC ............ H04B 10/524; H04B 10/50595; H04B 10/50575; H04B 10/2503; H04B 10/532
USPC ....... 398/183, 184, 185, 186, 187, 188, 189, 398/190, 191, 192, 193, 194, 198, 158, 398/159, 135, 136, 195, 196, 197, 199
See application file for complete search history.

(56) References Cited

U.S. PATENT DOCUMENTS

| | | |
|---|---|---|
| 2015/0236790 A1 | 8/2015 | Guo et al. |
| 2016/0127039 A1 | 5/2016 | Guo |
| 2019/0036611 A1* | 1/2019 | Fujita .................... H04B 10/516 |
| 2019/0146303 A1* | 5/2019 | Cavaliere ............ H04L 25/4917 |

FOREIGN PATENT DOCUMENTS

| | | |
|---|---|---|
| CN | 104485997 A | 4/2015 |
| CN | 104869092 A | 8/2015 |
| WO | 2015043431 A1 | 4/2015 |

* cited by examiner

SIGNAL MODULATION AND DEMODULATION METHOD AND SYSTEM, AND APPARATUS

CROSS-REFERENCE TO RELATED APPLICATIONS

This application is a continuation of International Application No. PCT/CN2016/097721 filed on Aug. 31, 2016, the disclosure of which is hereby incorporated by reference in its entirety.

TECHNICAL FIELD

The present application relates to the field of signal processing technologies, and in particular, to a signal modulation and demodulation method and system, and an apparatus.

BACKGROUND

Four-level pulse amplitude modulation (PAM4) is a higher-order modulation format whose spectrum efficiency is twice that of a non-return-to-zero (NRZ) code. In backplane interconnection, the PAM4 has been included into a study of IEEE 802.3bj. In next-generation 100G Ethernet, the PAM4 modulation format receives extensive attention.

As shown in FIG. 1, in an intensity-modulation and direct-detection (IMDD) system, a specific process of PAM4 modulation and demodulation includes: encoding, by a transmit end, two 2-level NRZ signals into one 4-level PAM signal by using a PAM4 encoder; converting, by a transmitter, the PAM signal into a PAM optical signal, optically modulating the PAM optical signal by using an electro-optic modulator, and sending an optical signal obtained through the optical modulation; and converting, by a receive end, the optical signal into an electrical signal by using a receiver, and converting the electrical signal into two 2-level NRZ signals by using a PAM4 decoder.

Specifically, if a PAM optical signal is denoted as S, and an optical carrier is denoted as C, the optical signal obtained by the transmitter after performing optical modulation is (C+S), and a process of converting the optical signal into the electrical signal by the receive end by using the receiver is: $(C+S)(C^*+S^*)=CC^*+(CS^*+C^*S)+SS^*$, where $CC^*$ means that a carrier is multiplied lied by a conjugate of the carrier, and that a direct current is generated and is filtered out by a DC blocking capacitor in the receiver; $CS^*$ and $C^*S$ respectively means that a carrier is multiplied by a conjugate of a signal and that a conjugate of the carrier is multiplied by the signal, and information that needs to be received is generated; and $SS^*$ is signal-signal beat interference (SSBI).

In the foregoing PAM4 modulation and demodulation process, the PAM optical signal is modulated at QUAD points (where callouts in FIG. 4 below may be referred to) on a modulation curve of the electro-optic modulator. That is, when optical modulation is performed, a bias voltage of the electro-optic modulator is set to $H \cdot V_{pi}+V_{pi}/2$ (where H is a positive integer, a negative integer, or 0), so that SSBI is generated after the receiver converts the optical signal into the electrical signal. Because the SSBI interferes with a useful signal, the generated SSBI affects performance of the IMDD system. $V_{pi}$ is a variation value of the bias voltage in any cycle of the modulation curve of the electro-optic modulator when an output optical power of the electro-optic modulator varies from a maximum value to a minimum value or varies from a minimum value to a maximum value, and the modulation curve is a curve corresponding to a function whose independent variable is the bias voltage and dependent variable is the output optical power. When the bias voltage is 0, the output optical power is the largest.

SUMMARY

Embodiments of the present disclosure provide a signal modulation and demodulation method and system, and an apparatus, to eliminate SSBI generated in a modulation and demodulation method in the prior art.

To achieve the foregoing objective, the following technical solutions are used in the embodiments of the present disclosure.

According to a first aspect, a signal modulation method applied to an IMDD system is provided. The method includes: performing, by a transmit end, PAM encoding on an input signal to obtain a PAM signal; electrically modulating, by the transmit end, the PAM signal by using a first filter; converting, by the transmit end, the electrically modulated PAM signal into an analog signal; optically modulating, by the transmit end, the analog signal by using an electro-optic modulator to obtain an optical signal, where a bias voltage of the electro-optic modulator is $M+V_{pi}$, $V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve is a curve corresponding to a function whose independent variable is the bias voltage and dependent variable is the output optical power, and M is a value of the bias voltage when the output optical power is the largest; and sending, by the transmit end, the optical signal.

According to the method provided in the first aspect, the analog signal is modulated after the bias voltage of the electro-optic modulator is set to $M+V_{pi}$, that is, the analog signal is modulated at a NULL point on the modulation curve of the electro-optic modulator. In this case, a power of an optical carrier approximates 0. A wanted signal that is transmitted is included in SSBI. This is equivalent to that impact of $SS^*$ on system performance is eliminated, that is, impact of the SSBI on the system performance is eliminated.

With reference to the first aspect, in a first possible implementation, an absolute value of a difference between 1 and a function value of a convolution of a shaping function included in the first filter and a shaping function included in a second filter at a sampling time point falls within a first preset range, and the second filter is a filter, used by a receive end that receives the optical signal sent by the transmit end, to electrically demodulate an electrical signal obtained after converting the received optical signal.

According to the possible implementation, the receive end can better restore a signal sent by the transmit end.

With reference to the first possible implementation of the first aspect, in a second possible implementation, both the first filter and the second filter are CAP filters.

With reference to the first possible implementation or the second possible implementation of the first aspect, in a third possible implementation, cycles of virtual carriers of the first filter and the second filter are greater than or equal to $T_b$, and $T_b$ is a cycle of the input signal.

According to the possible implementation, spectrum efficiency can be improved.

With reference to any one of the first aspect or the first possible implementation to the third possible implementation of the first aspect, in a fourth possible implementation, an absolute value of a difference between 0 and a direct current of the electrically modulated PAM signal falls within a third preset range.

According to the possible implementation, the power of the optical carrier can be more approximate to 0.

According to a second aspect, a signal demodulation method applied to an IMDD system is provided. The method includes: receiving, by a receive end, an optical signal, and converting the optical signal into an electrical signal, where an absolute value of a difference between 0 and a power of an optical carrier of the optical signal falls within a second preset range; electrically demodulating, by the receive end, the electrical signal by using a second filter; and performing, by the receive end, PAM decoding on the electrically demodulated electrical signal to obtain a restored input signal.

According to the method provided in the second aspect, the electrical signal is obtained by converting the optical signal sent by the transmit end. An absolute value of a difference between 0 and a power of an optical carrier of the optical signal falls within a second preset range. Therefore, the electrical signal includes only SS*, that is, a wanted signal that is transmitted is included in SS*, and SS* is a signal that needs to be received by the receive end. Therefore, SSBI is no longer interference, and impact of the SSBI on system performance is eliminated.

With reference to the second aspect, in a first possible implementation, an absolute value of a difference between 1 and a function value of a convolution of a shaping function included in the second filter and a shaping function included in a first filter at a sampling time point falls within a first preset range, a cut-off frequency of the second filter ranges from once to twice a frequency of a virtual electrical carrier of the second filter, the frequency of the virtual electrical carrier of the second filter is greater than or equal to half a Baud rate of the input signal, and the first filter is a filter, used by a transmit end that sends the optical signal, to electrically modulate a signal obtained by performing PAM encoding on the input signal.

According to the possible implementation, the receive end can better restore a signal sent by the transmit end.

With reference to the first possible implementation of the second aspect, in a second possible implementation, both the first filter and the second filter are CAP filters.

With reference to the first possible implementation or the second possible implementation of the second aspect, in a third possible implementation, cycles of virtual carriers of the first filter and the second filter are greater than or equal to $T_b$, and $T_b$ is a cycle of the input signal.

According to the possible implementation, spectrum efficiency can be improved.

According to a third aspect, a signal modulation apparatus applied to an IMDD system is provided. The apparatus includes a PAM encoder, a first filter, a DAC, and an electro-optic modulator that are sequentially connected. The PAM encoder is configured to perform PAM encoding on an input signal to obtain a PAM signal. The first filter is configured to electrically modulate the PAM signal. The DAC is configured to convert the electrically modulated PAM signal into an analog signal. The electro-optic modulator is configured to: optically modulate the analog signal to obtain an optical signal; and send the optical signal. A bias voltage of the electro-optic modulator is $M+V_{pi}$, where $V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve is a curve corresponding to a function whose independent variable is the bias voltage and dependent variable is the output optical power, and M is a value of the bias voltage when the output optical power is the largest.

The components in the apparatus provided in the third aspect are configured to implement the method provided in the first aspect. Therefore, for beneficial effects of the apparatus, refer to the beneficial effects of the method provided in the first aspect. Details are not described herein again.

With reference to the third aspect, in a first possible implementation, the apparatus further includes an optical carrier device connected to the electro-optic modulator, configured to provide input light for the electro-optic modulator to optically modulate the analog signal.

With reference to the third aspect or the first possible implementation of the third aspect, in a second possible implementation, an absolute value of a difference between 1 and a function value of a convolution of a shaping function included in the first filter and a shaping function included in a second filter at a sampling time point falls within a first preset range, and the second filter is a filter, used by a receive end that receives the optical signal sent by the transmit end, to electrically demodulate an electrical signal obtained after converting the received optical signal.

According to the possible implementation, the signal demodulation apparatus can better restore a signal sent by a signal modulation apparatus.

With reference to the second possible implementation of the third aspect, in a third possible implementation, both the first filter and the second filter are CAP filters.

With reference to the second possible implementation or the third possible implementation of the third aspect, in a fourth possible implementation, cycles of virtual carriers of the first filter and the second filter are greater than or equal to $T_b$, and $T_b$ is a cycle of the input signal.

According to the possible implementation, spectrum efficiency can be improved.

With reference to any one of the third aspect or the first possible implementation to the fourth possible implementation of the third aspect, in a fifth possible implementation, an absolute value of a difference between 0 and a direct current of the electrically modulated PAM signal falls within a third preset range.

According to the possible implementation, a power of an optical carrier can be more approximate to 0.

According to a fourth aspect, a signal demodulation apparatus applied to an IMDD system is provided. The signal demodulation apparatus includes a receiver, a second filter, and a PAM decoder that are sequentially connected. The receiver is configured to: receive an optical signal; and convert the optical signal into an electrical signal, where an absolute value of a difference between 0 and a power of an optical carrier of the optical signal falls within a second preset range. The second filter is configured to electrically demodulate the electrical signal. The PAM decoder is configured to perform PAM decoding on the electrically demodulated electrical signal to obtain a restored input signal.

The components in the apparatus provided in the fourth aspect are configured to implement the method provided in the second aspect. Therefore, for beneficial effects of the apparatus, refer to the beneficial effects of the method provided in the second aspect. Details are not described herein again.

With reference to the fourth aspect, in a first possible implementation, an absolute value of a difference between 1 and a function value of a convolution of a shaping function included in the second filter and a shaping function included in a first filter at a sampling time point falls within a first preset range, a cut-off frequency of the second filter ranges from once to twice a frequency of a virtual electrical carrier of the second filter, the frequency of the virtual electrical carrier of the second filter is greater than or equal to half a Baud rate of the input signal, and the first filter is a filter, used by a transmit end that sends the optical signal, to electrically modulate a signal obtained by performing PAM encoding on the input signal.

According to the possible implementation, the signal demodulation apparatus can better restore a signal sent by a signal modulation apparatus.

With reference to the first possible implementation of the fourth aspect, in a second possible implementation, both the first filter and the second filter are CAP filters.

With reference to the first possible implementation or the second possible implementation of the fourth aspect, in a third possible implementation, cycles of virtual carriers of the first filter and the second filter are greater than or equal to $T_b$, and $T_b$ is a cycle of the input signal.

According to the possible implementation, spectrum efficiency can be improved.

According to a fifth aspect, a signal modulation and demodulation system is provided. The signal modulation and demodulation system includes any signal modulation apparatus provided in the third aspect and any signal demodulation apparatus provided in the fourth aspect.

A signal modulation apparatus included in the system provided in the fifth aspect is the apparatus provided in the third aspect and a signal demodulation apparatus is the apparatus provided in the fourth aspect. Therefore, for beneficial effects of the system, refer to the beneficial effects of the apparatuses provided in the third aspect and the fourth aspect. Details are not described herein again.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

The following describes the technical solutions in the embodiments of the present disclosure in detail with reference to the accompanying drawings in the embodiments of the present disclosure. Apparently, the described embodiments are merely some but not all of the embodiments of the present disclosure.

The "first" and "second" in a first filter and a second filter in the embodiments may be any filter that is not specified herein, and are merely intended to distinguish between the two filters. Similarly, "first", "second", and "third" in a first preset range, a second preset range, and a third preset range are merely intended to distinguish between the three preset ranges.

Figure 1:
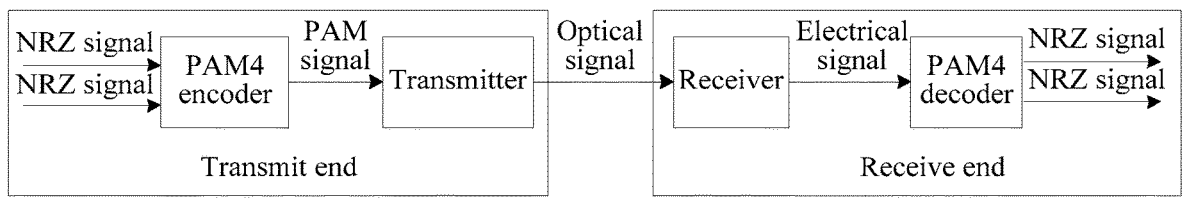
FIG. 1 is a schematic composition diagram of a system for implementing a PAM4 modulation and demodulation method in the prior art.
Figure 2:
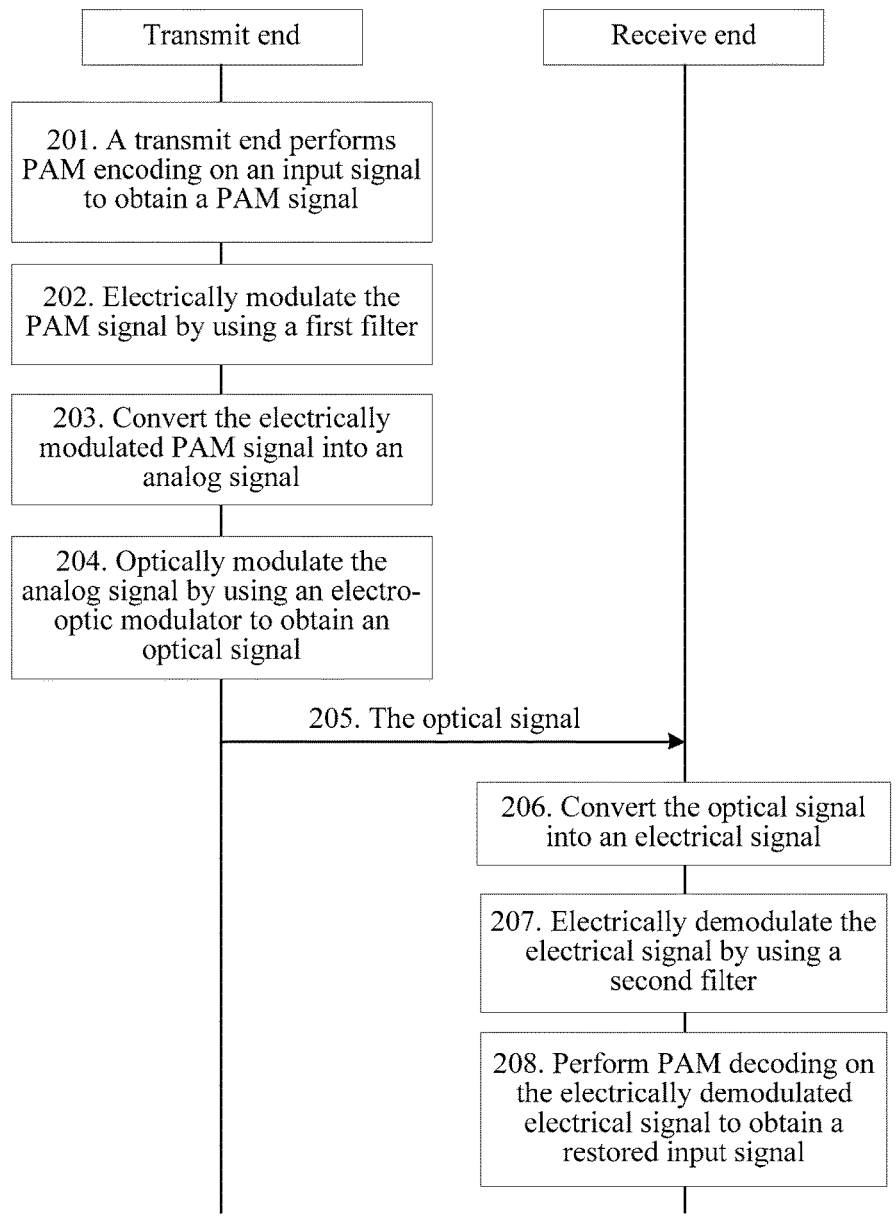
FIG. 2 is an interaction flowchart of a signal modulation and demodulation method according to an embodiment of the present disclosure.

An embodiment of the present disclosure provides a signal modulation and demodulation method applied to an IMDD system. As shown in FIG. 2, the method includes the following steps.

201. A transmit end performs PAM encoding on an input signal to obtain a PAM signal.

The transmit end in this embodiment of the present disclosure may be a network device, and may be specifically a base station, a router, a switch, or the like.

The input signal may be an NRZ signal, or may be a PAM signal. When the input signal is a PAM signal, a PAM signal obtained before the PAM encoding and a PAM signal obtained after the PAM encoding may be PAM signals of different levels. The PAM signal may be specifically a PAM signal of 4 levels, 8 levels, 16 levels, or the like.

A method in the prior art may be used during specific implementation of step 201. For example, when the PAM signal is a PAM4 signal, two 2-level NRZ signals may be encoded into one PAM4 signal by using a PAM4 encoder.

202. The transmit end electrically modulates the PAM signal by using a first filter.

Optionally, an absolute value of a difference between 1 and a function value of a convolution of a shaping function included in the first filter and a shaping function included in a second filter at a sampling time point falls within a first preset range, and the second filter is a filter, used by a receive end that receives the optical signal sent by the transmit end, to electrically demodulate an electrical signal obtained after converting the received optical signal. Preferably, the function value of the convolution of the shaping function included in the first filter and the shaping function included in the second filter at the sampling time point is equal to 1.

According to the optional and preferable method, the receive end can better restore a signal sent by the transmit end. For details, refer to descriptions of FIG. 5 in the following embodiments.

Both the first filter and the second filter may be carrierless amplitude phase modulation (CAP) filters.

Optionally, cycles of virtual carriers of the first filter and the second filter are greater than or equal to $T_b$, and $T_b$ is a cycle of the input signal. In this case, spectrum efficiency can be improved. Preferably, the cycles of the virtual carriers of the first filter and the second filter are equal to $T_b$.

203. The transmit end converts the electrically modulated PAM signal into an analog signal.

204. The transmit end optically modulates the analog signal by using an electro-optic modulator to obtain an optical signal, where a bias voltage of the electro-optic modulator is $M+V_{pi}$, $V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve is a curve corresponding to a function whose independent variable is the bias voltage and dependent variable is the output optical power, and M is a value of the bias voltage when the output optical power is the largest.

Specifically, the electro-optic modulator may be a Mach-Zehnder electro-optic modulator (MZM).

Specifically, if the analog signal is denoted as S, and an optical carrier is denoted as C, the optical signal obtained by the transmit end by optically modulating the analog signal is (C+S).

Figure 3:
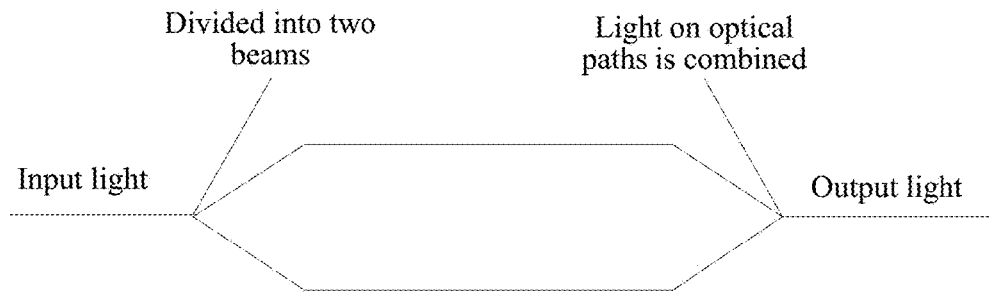
FIG. 3 is a schematic diagram of a principle of performing optical modulation by using an electro-optic modulator according to an embodiment of the present disclosure.

Specifically, the electro-optic modulator works mainly based on an electro-optic effect. As shown in FIG. 3, a specific method is as follows: First, input light is divided into two beams respectively entering two optical paths of the electro-optic modulator. An electrode is added to each optical path, and the electrode changes a phase of light on the optical path, when a voltage difference between the electrodes of the two optical paths is $M+V_{pi}$, phases of light on the two optical paths are opposite to each other. The light on the two optical paths interferes at an output end, and is combined and output. A power of the output light approximates 0, that is, a power of the optical carrier approximates 0.

The bias voltage of the electro-optic modulator refers to a difference between voltages on the electrodes added to the two optical paths of the electro-optic modulator. The output optical power of the electro-optic modulator refers to a size of a power of an output optical carrier of the electro-optic modulator. The modulation curve of the electro-optic modulator refers to a curve of a function whose independent variable is the bias voltage and dependent variable is the output optical power. Based on a design of the electro-optic modulator, the curve may be a sinusoid curve, a cosine curve, or a curve with a particular phase difference from a sinusoid curve. A value of M may be determined based on the modulation curve of the electro-optic modulator.

Figure 4:
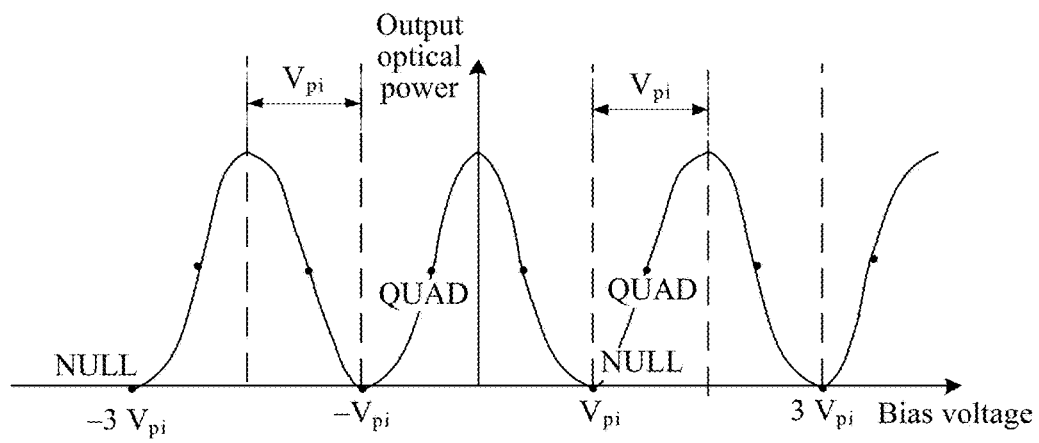
FIG. 4 is a schematic diagram of a modulation curve of an electro-optic modulator according to an embodiment of the present disclosure.

In this embodiment of the present disclosure, an example in which the curve is a cosine curve is used for description. For details of the curve, refer to FIG. 4. The output optical power of the electro-optic modulator varies cyclically according to a cosine law as the bias voltage varies. $V_{pi}$ is a variation value of the bias voltage in a variation cycle in a process in which the output optical power of the electro-optic modulator varies from a maximum value to a minimum value or varies from a minimum value to a maximum value. In this case, when the value of the bias voltage is $HV_{pi}+V_{pi}/2$, the output optical power of the electro-optic modulator is half a maximum output optical power of the electro-optic modulator. At this time, a point on the curve is a QUAD point. When the value of the bias voltage is $M+V_{pi}$ and $M=2HV_{pi}$, the output optical power of the electro-optic modulator approximates 0. At this time, the point on the curve is a NULL point, and a value of H may be a positive integer, a negative integer, or 0.

If the modulation curve of the electro-optic modulator is a cosine curve, $M=2HV_{pi}$. Usually, the bias voltage of the electro-optic modulator is set between −30 V and +30 V, $V_{pi}$ is usually 4 V, and the value of H may be set to −4, −3, −2, −1, 0, 1, 2, and 3. Only an example is described herein, and a specific value of H may be determined based on an actual application scenario. This is not specifically limited in this embodiment of the present disclosure.

205. The transmit end sends the optical signal.

206. A receive end receives the optical signal, and converts the optical signal into an electrical signal, where an absolute value of a difference between 0 and a power of an optical carrier of the optical signal falls within a second preset range.

The receive end in this embodiment of the present disclosure may be a network device that communicates with the transmit end, and may be specifically a base station, a router, a switch, or the like.

The second preset range is an allowable error range. When the bias voltage of the electro-optic modulator is $M+V_{pi}$, the difference between 0 and the power of the optical carrier falls within the second preset range.

A process in which the receive end converts the optical signal into the electrical signal is: $(C+S)(C^*+S^*)=CC^*+(CS^*+C^*S)+SS^*$, where $C^*$ is a conjugate of C and $S^*$ is a conjugate of S. When the bias voltage of the electro-optic modulator is $M+V_{pi}$, the analog signal is modulated at the NULL point on the modulation curve of the electro-optic modulator. A power of the optical carrier approximates 0 at the NULL point on the modulation curve of the electro-optic modulator namely C=0, $(C+S)(C^*+S^*)=CC^*+(CS^*+C^*S)+SS^*=SS^*$. That is, a useful signal that is transmitted is included in $SS^*$, and $SS^*$ is a signal that needs to be received by the receive end. Therefore, SSBI is no longer interference, and impact of the SSBI on system performance is eliminated.

Specifically, an absolute value of a difference between 0 and a direct current of a signal (that is, $A_k f(t)$ below) obtained by electrically modulating the PAM signal by using the first filter falls within a third preset range. Preferably, the direct current of the signal obtained by electrically modulating the PAM signal by using the first filter is 0, and the first preset range and the third preset range are allowable error ranges. In this case, the power of the optical carrier can be more approximate to 0.

207. The receive end electrically demodulates the electrical signal by using a second filter.

Optionally, the absolute value of the difference between 1 the function value of the convolution of the shaping function included in the second filter and the shaping function included in the first filter at the sampling time point falls within the first preset range. A cut-off frequency of the second filter ranges from once or twice a frequency of a virtual electrical carrier of the second filter, and the frequency of the virtual electrical carrier of the second filter is greater than or equal to half a Baud rate of the input signal.

According to the optional method, the receive end can better restore a signal sent by the transmit end. For details, refer to descriptions of FIG. 5 in the following embodiments.

In the prior art, a wanted signal received by the receive end falls within $(CS^*+C^*S)$ and therefore the wanted signal may be obtained through direct decoding. However, in this embodiment of the present disclosure, because a wanted signal received by the receive end falls within SS*, the wanted signal needs to be obtained by electrically demodulating SS* by using a filter and then decoding SS*.

208. The receive end performs PAM decoding on the electrically demodulated electrical signal to obtain a restored input signal.

The following describes principles of the technical solution of the present disclosure by using an example. The PAM signal is denoted as $A_k$, a first CAP filter is $f(t)=g(t)^2 \cos(\omega_c \tau)$, a second CAP filter is $h(t)=g_{match}(t)$, and DC is a direct current of $A_k f(t)$, so that a signal obtained by electrically modulating $A_k$ by using the first CAP filter is $A_k f(t)$, and a signal obtained after $A_k f(t)$ passes through a DC blocking capacitor is $A_k f(t)$–DC. Based on the analysis on step 206, a signal obtained after the receive end converts the received optical signal into the electrical signal is $(A_k f(t)-DC)^2$, and a signal obtained by electrically demodulating $(A_k f(t)-DC)^2$ by using the second CAP filter is $(A_k f(t)-DC)^2 \otimes h(t)$.

$$(A_k f(t) - DC)^2 \otimes h(t) =$$

$$A_k^2 \int \left( g(\tau)^2 \cos(\omega_c \tau)^2 + \frac{DC g(\tau) \cos(\omega_c \tau)}{A_k} + \frac{DC^2}{A_k^2} \right) g_{match}(t-\tau) d\tau =$$

$$\frac{A_k^2}{2} \int g(\tau)^2 g_{match}(t-\tau) d\tau \cos(2\omega_c \tau) d\tau + \frac{A_k^2}{2} \int g(\tau)^2 g_{match}(t-\tau) d\tau +$$

$$A_k DC \int g(\tau) g_{match}(t-\tau) \cos(\omega_c \tau) d\tau + DC \int g_{match}(t-\tau) d\tau$$

In the foregoing calculation result, $\omega_c$ is a frequency of a virtual electrical carrier of the second CAP filter. In the foregoing calculation result, because a frequency in a first item $$\frac{A_k^2}{2} \int g(\tau)^2 g_{match}(t-\tau) d\tau \cos(2\omega_c \tau) d\tau$$

is excessively large and is filtered out by a receiver or the second CAP filter, and a fourth item $DC \int g_{match}(t-\tau) d\tau$ is a direct current and is filtered out by a DC blocking capacitor in the receiver, during design, the direct current of $A_k f(t)$ may be set to 0, so that DC is 0, a third item $A_k DC \int g(\tau) g_{match}(t-\tau) \cos(\omega_c \tau) d\tau$ is equal to 0. A shaping function included in the first CAP filter is $g(t)^2$, and a shaping function included in the second CAP filter is $g_{match}(t)$. In this embodiment of the present disclosure $g(t)^2 \otimes g_{match}(t)$ is equal to 1 at sampling time point, and therefore a second item is equal to $A_k^2$ at the sampling time point.

Figure 5:
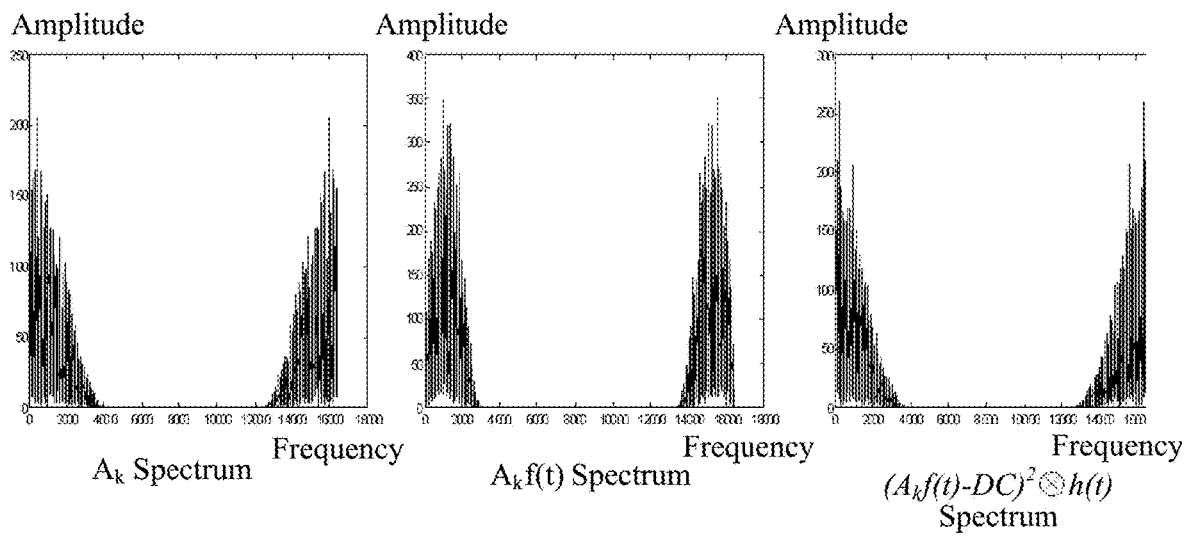
FIG. 5 is a schematic diagram of spectrums of a plurality of signals according to an embodiment of the present disclosure.

Specifically, FIG. 5 shows spectrum diagrams of $A_k$, $A_k f(t)$, and $(A_k f(t)-DC)^2 \otimes h(t)$. It can be learned from FIG. 5 that the direct current of $A_k f(t)$ is equal to 0, and the spectrum diagrams of $A_k$ and $(A_k f(t)-DC)^2 \otimes h(t)$ are similar. It can be learned that, after converting the received optical signal into the electrical signal and electrically modulating the electrical signal by using the second CAP filter, the receive end relatively accurately restores the PAM signal.

In the IMDD system, a method for calculating a carrier to signal power ratio (CSPR) of the PAM optical signal is $$CSPR = \frac{P_c}{P_c + P_s},$$

where $P_c$ is the power of the optical carrier, and $P_s$ is a power of the optical signal. In the prior art, the power of the optical carrier occupies more than half a sum of the powers of the optical carrier and the optical signal, that is, a value of the CSPR is greater than 0.5.

In the method provided in this embodiment of the present disclosure, the power of the optical carrier is 0, and therefore the value of the CSPR is the smallest (that is, 0). In this way, all powers may be used for transmitting the wanted signal (that is, the optical signal). Therefore, system performance can be improved. In addition, in a same optical signal-to-noise ratio (OSNR) (where $$OSNR = \frac{P_c + P_s}{N}$$

and N is noise), because $P_c$ reduces, $P_s$ increases. In this way, an actual signal-to-noise ratio (SN)

$$\left( SNR = \frac{P_s}{N} \right)$$

can be improved.

According to the method provided in this embodiment of the present disclosure, the analog signal is modulated after the bias voltage of the electro-optic modulator is set to $M+V_{pi}$, that is, the analog signal is modulated at the NULL point on the modulation curve of the electro-optic modulator. In this case, the power of the optical carrier approximates 0. The wanted signal that is transmitted is included in the SSBI. This is equivalent to that impact of SS* on system performance is eliminated, that is, impact of the SSBI on the system performance is eliminated.

Figure 6:
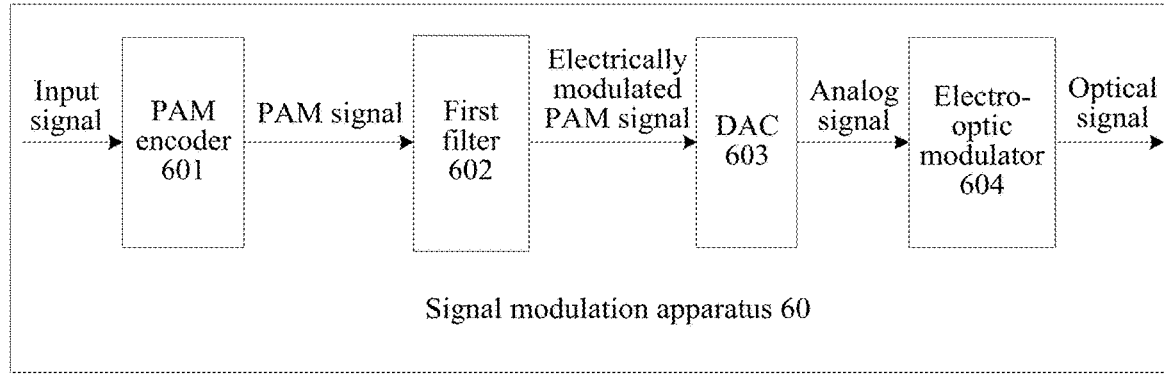
FIG. 6 is a schematic composition diagram of a signal modulation apparatus according to an embodiment of the present disclosure.

An embodiment of the present disclosure further provides a signal modulation apparatus 60 applied to an IMDD system. As shown in FIG. 6, the apparatus 60 includes a PAM encoder 601, a first filter 602, a digital-to-analog converter (DAC) 603, and an electro-optic modulator 604 that are sequentially connected.

The PAM encoder 601 is configured to perform PAM encoding on an input signal to obtain a PAM signal.

The first filter 602 is configured to electrically modulate the PAM signal.

The DAC 603 is configured to convert the electrically modulated PAM signal into an analog signal.

The electro-optic modulator 604 is configured to: optically modulate the analog signal to obtain an optical signal; and send the optical signal, where a bias voltage of the electro-optic modulator 604 is $M+V_{pi}$, $V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve is a curve corresponding to a function whose independent variable is the bias voltage and dependent variable is the output optical power, and M is a value of the bias voltage when the output optical power is the largest.

The PAM encoder 601, the first filter 602, and the DAC 603 may be integrated into a digital signal processor (DSP).

Figure 7:
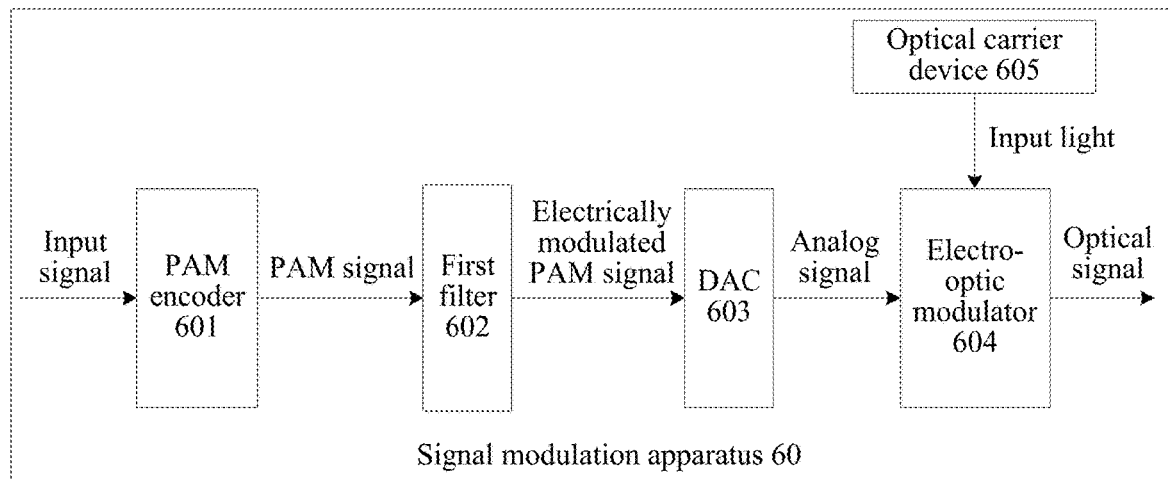
FIG. 7 is a schematic composition diagram of another signal modulation apparatus according to an embodiment of the present disclosure.

Optionally, as shown in FIG. 7, the apparatus 60 further includes an optical carrier device 605 connected to the electro-optic modulator 604, configured to provide input light for the electro-optic modulator 604 to optically modulate the analog signal.

Optionally, an absolute value of a difference between 1 and a function value of a convolution of a shaping function included in the first filter 602 and a shaping function included in a second filter at a sampling time point falls within a first preset range, and the second filter is a filter, used by a receive end that receives the optical signal sent by the transmit end, to electrically demodulate an electrical signal obtained after converting the received optical signal.

Optionally, both the first filter 602 and the second filter are CAP filters.

Optionally, cycles of virtual carriers of the first filter 602 and the second filter are greater than or equal to $T_b$, and $T_b$ is a cycle of the input signal.

The components of the apparatus 60 provided in this embodiment of the present disclosure are configured to implement the foregoing method. Therefore, for beneficial effects of the apparatus 60, refer to the beneficial effects of the foregoing method part. Details are not described herein again.

Figure 8:
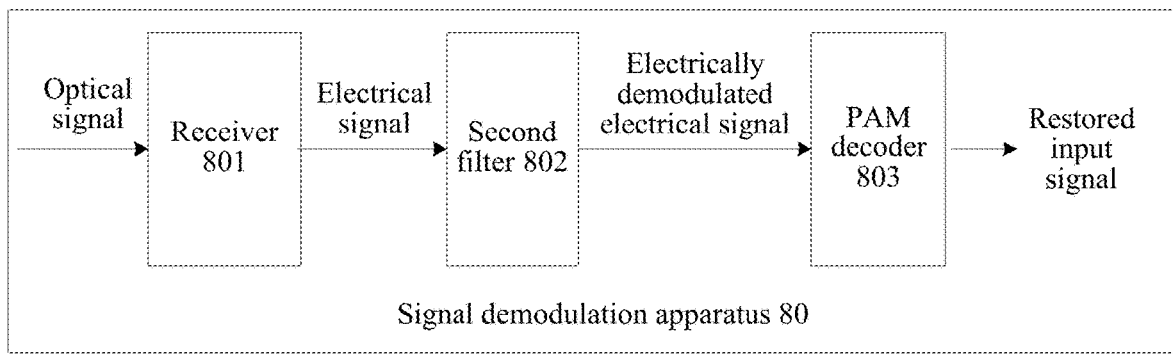
FIG. 8 is a schematic composition diagram of a signal demodulation apparatus according to an embodiment of the present disclosure.

An embodiment of the present disclosure further provides a signal demodulation apparatus 80 applied to an IMDD system. As shown in FIG. 8, the apparatus 80 includes a receiver 801, a second filter 802, and a PAM decoder 803 that are sequentially connected.

The receiver 801 is configured to: receive an optical signal; and convert the optical signal into an electrical signal, where an absolute value of a difference between 0 and a power of an optical carrier of the optical signal falls within a second preset range.

The second filter 802 is configured to electrically demodulate the electrical signal.

The PAM decoder 803 is configured to perform PAM decoding on the electrically demodulated electrical signal to obtain the restored input signal.

The second filter 802 and the PAM decoder 803 may be integrated into one DSP.

Optionally, an absolute value of a difference between 1 and a function value of a convolution of a shaping function included in the second filter 802 and a shaping function included in a first filter at a sampling time point falls within a first preset range, a cut-off frequency of the second filter 802 ranges from once to twice a frequency of a virtual electrical carrier of the second filter 802, the frequency of the virtual electrical carrier of the second filter 802 is greater than or equal to half a Baud rate of the input signal, and the first filter is a filter, used by a transmit end that sends the optical signal, to electrically modulate a signal obtained by performing PAM encoding on the input signal.

Optionally, both the first filter and the second filter 802 are CAP filters.

Optionally, cycles of virtual carriers of the first filter and the second filter 802 are greater than or equal to $T_b$, and $T_b$ is a cycle of the input signal.

The components of the apparatus 80 provided in this embodiment of the present disclosure are configured to implement the foregoing method. Therefore, for beneficial effects of the apparatus 80, refer to the beneficial effects of the foregoing method part. Details are not described herein again.

In addition, FIG. 6, FIG. 7, and FIG. 8 further show signal processing processes.

Figure 9:
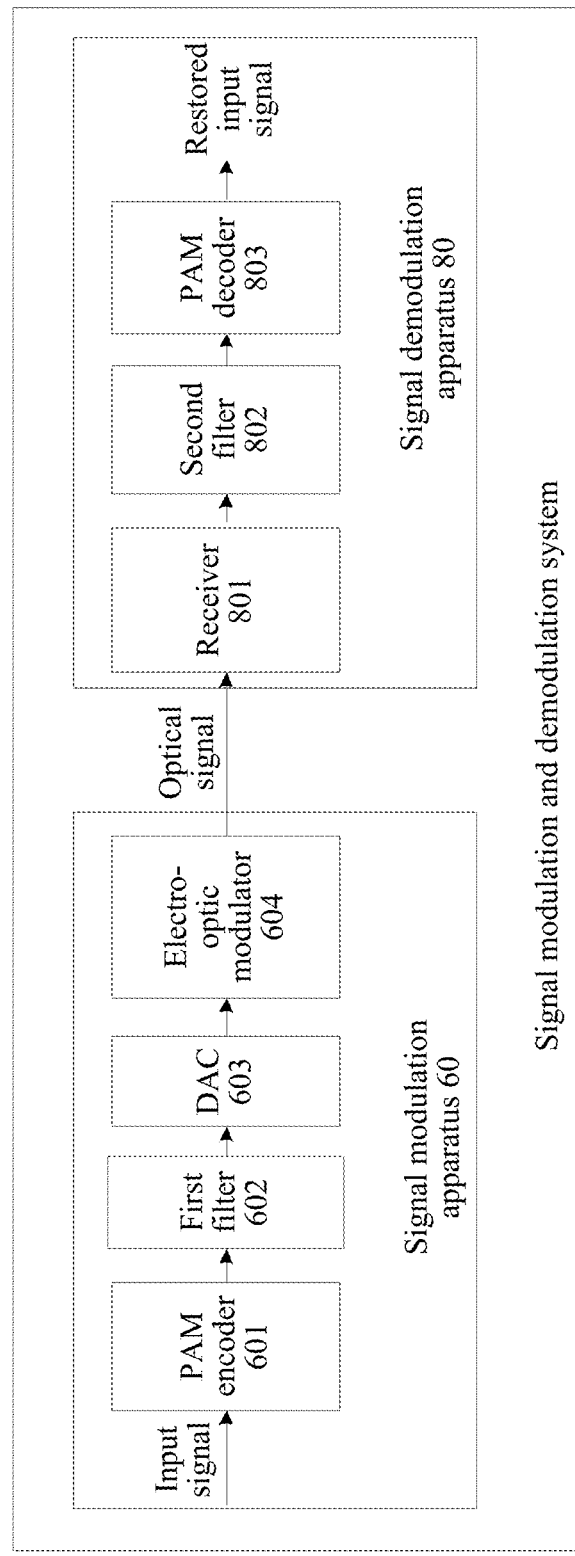
FIG. 9 is a schematic composition diagram of a signal modulation and demodulation system according to an embodiment of the present disclosure.

An embodiment of the present disclosure further provides a signal modulation and demodulation system, including any signal modulation apparatus and any signal demodulation apparatus provided in the foregoing embodiments. For example, as shown in FIG. 9, the system may include the signal modulation apparatus 60 shown in FIG. 6 and the signal demodulation apparatus 80 shown in FIG. 8. It should be noted that, a signal processing process is not shown in FIG. 9. A signal modulation apparatus included in the system is the apparatus 60 and a signal demodulation apparatus is the apparatus 80. Therefore, for beneficial effects of the system, refer to the beneficial effects of the apparatus 60 and the apparatus 80. Details are not described herein again.

In the several embodiments provided in this application, it should be understood that the disclosed apparatus and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed.

In addition, functional modules in the embodiments of in this application may be integrated into one processing module, or each of the modules may exist alone physically, or two or more modules are integrated into one module. The integrated module may be implemented in a form of hardware, or may be implemented in a form of a software functional module.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A signal modulation method applied to an intensity-modulation and direct-detection (IMDD) system, the method comprising:
    performing, by a transmit end, pulse amplitude modulation (PAM) encoding on an input signal to obtain a PAM signal;
    electrically modulating, by the transmit end, the PAM signal using a first filter;
    converting, by the transmit end, the electrically modulated PAM signal into an analog signal;
    optically modulating, by the transmit end, the analog signal using an electro-optic modulator to obtain an optical signal, wherein a bias voltage of the electro-optic modulator is $M+V_{pi}$, wherein
    $V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve being a curve corresponding to a function whose independent variable is the bias voltage and dependent variable is the output optical power, and
    M is a value of the bias voltage when the output optical power is the largest; and sending, by the transmit end, the optical signal.

2. The method according to claim 1, wherein:
    an absolute value of a difference between 1 and a function value of a convolution of a shaping function comprised in the first filter and a shaping function comprised in a second filter at a sampling time point falls within a first preset range; and the second filter is a filter to be used by a receive end that receives the optical signal sent by the transmit end for electrically demodulating an electrical signal obtained after converting the received optical signal.

3. The method according to claim 2, wherein both the first filter and the second filter are carrier-less amplitude phase modulation (CAP) filters.

4. The method according to claim 3, wherein cycles of virtual carriers of the first filter and the second filter are greater than or equal to $T_b$, and $T_b$ is a cycle of the input signal.

5. The method according to claim 2, wherein cycles of virtual carriers of the first filter and the second filter are greater than or equal to $T_b$, and $T_b$ is a cycle of the input signal.

6. A signal modulation apparatus, applied to an intensity-modulation and direct-detection (IMDD) system, the apparatus comprising:
a pulse amplitude modulation (PAM) encoder configured to perform PAM encoding on an input signal to obtain a PAM signal;
a first filter configured to electrically modulate the PAM signal;
a digital-to-analog converter (DAC) configured to convert the electrically modulated PAM signal into an analog signal; and
an electro-optic modulator configured to:
optically modulate the analog signal to obtain an optical signal, wherein a bias voltage of the electro-optic modulator is $M+V_{pi}$, wherein
$V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve being a curve corresponding to a function whose independent variable is the bias voltage and dependent variable is the output optical power, and
M is a value of the bias voltage when the output optical power is the largest, and send the optical signal.

7. The apparatus according to claim 6, further comprising:
an optical carrier device connected to the electro-optic modulator and configured to provide input light for the electro-optic modulator to optically modulate the analog signal.

8. The apparatus according to claim 7, wherein:
an absolute value of a difference between 1 and a function value of a convolution of a shaping function comprised in the first filter and a shaping function comprised in a second filter at a sampling time point falls within a first preset range; and
the second filter is a filter to be used by a receive end that receives the optical signal sent by the transmit end for electrically demodulating an electrical signal obtained after converting the received optical signal.

9. The apparatus according to claim 8, wherein both the first filter and the second filter are carrierless amplitude phase modulation (CAP) filters.

10. The apparatus according to claim 9, wherein cycles of virtual carriers of the first filter and the second filter are greater than or equal to $T_b$, and $T_b$ is a cycle of the input signal.

11. The apparatus according to claim 8, wherein cycles of virtual carriers of the first filter and the second filter are greater than or equal to $T_b$, and $T_b$ is a cycle of the input signal.

12. The apparatus according to claim 6, wherein:
an absolute value of a difference between 1 and a function value of a convolution of a shaping function comprised in the first filter and a shaping function comprised in a second filter at a sampling time point falls within a first preset range; and
the second filter is a filter to be used by a receive end that receives the optical signal sent by the transmit end for electrically demodulating an electrical signal obtained after converting the received optical signal.

13. The apparatus according to claim 12, wherein both the first filter and the second filter are carrierless amplitude phase modulation (CAP) filters.

14. The apparatus according to claim 13, wherein cycles of virtual carriers of the first filter and the second filter are greater than or equal to $T_b$, and $T_b$ is a cycle of the input signal.

15. The apparatus according to claim 12, wherein cycles of virtual carriers of the first filter and the second filter are greater than or equal to $T_b$, and $T_b$ is a cycle of the input signal.

16. A signal modulation and demodulation system, applied to an intensity-modulation and direct-detection (IMDD) system, the signal modulation and demodulation system comprising:
a signal modulation apparatus comprising,
a pulse amplitude modulation (PAM) encoder configured to perform PAM encoding on an input signal to obtain a PAM signal,
a first filter configured to electrically modulate the PAM signal,
a digital-to-analog converter (DAC) configured to convert the electrically modulated PAM signal into an analog signal, and
an electro-optic modulator configured to:
optically modulate the analog signal to obtain an optical signal, wherein a bias voltage of the electro-optic modulator is $M+V_{pi}$, wherein
$V_{pi}$ is a variation value of the bias voltage in any cycle of a modulation curve of the electro-optic modulator when an output optical power of the electro-optic modulator varies from a maximum value to a minimum value or varies from a minimum value to a maximum value, the modulation curve being a curve corresponding to a function whose independent variable is the bias voltage and dependent variable is the output optical power, and
M is a value of the bias voltage when the output optical power is the largest; and
send the optical signal; and
a signal demodulation apparatus comprising,
a receiver configured to receive the optical signal and convert the optical signal into an electrical signal, wherein an absolute value of a difference between 0 and a power of an optical carrier of the optical signal falls within a second preset range,
a second filter configured to electrically demodulate the electrical signal, and
a PAM decoder configured to perform PAM decoding on the electrically demodulated electrical signal to obtain a restored input signal.

17. The system according to claim 16, wherein:
an absolute value of a difference between 1 and a function value of a convolution of a shaping function comprised in the second filter and a shaping function comprised in a first filter at a sampling time point falls within a first preset range; and
a cut-off frequency of the second filter ranges from one to two times a frequency of a virtual electrical carrier of the second filter, wherein the frequency of the virtual electrical carrier of the second filter is greater than or equal to half a Baud rate of the input signal.

18. The system according to claim 17, wherein both the first filter and the second filter are carrier-less amplitude phase modulation CAP filters.

19. The system according to claim 17, wherein cycles of virtual carriers of the first filter and the second filter are greater than or equal to $T_b$, and $T_b$ is a cycle of the input signal.

* * * * *